Figure 3:
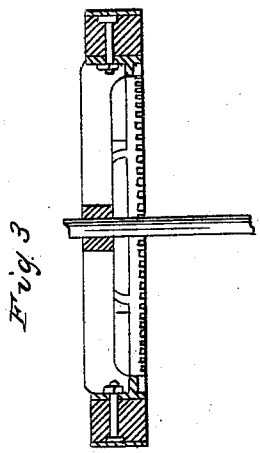
Figure 2:
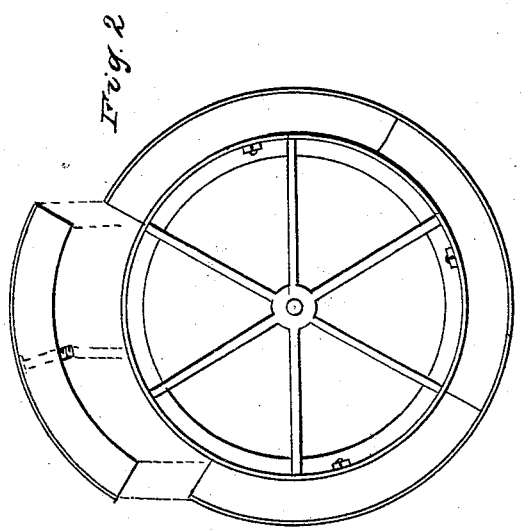

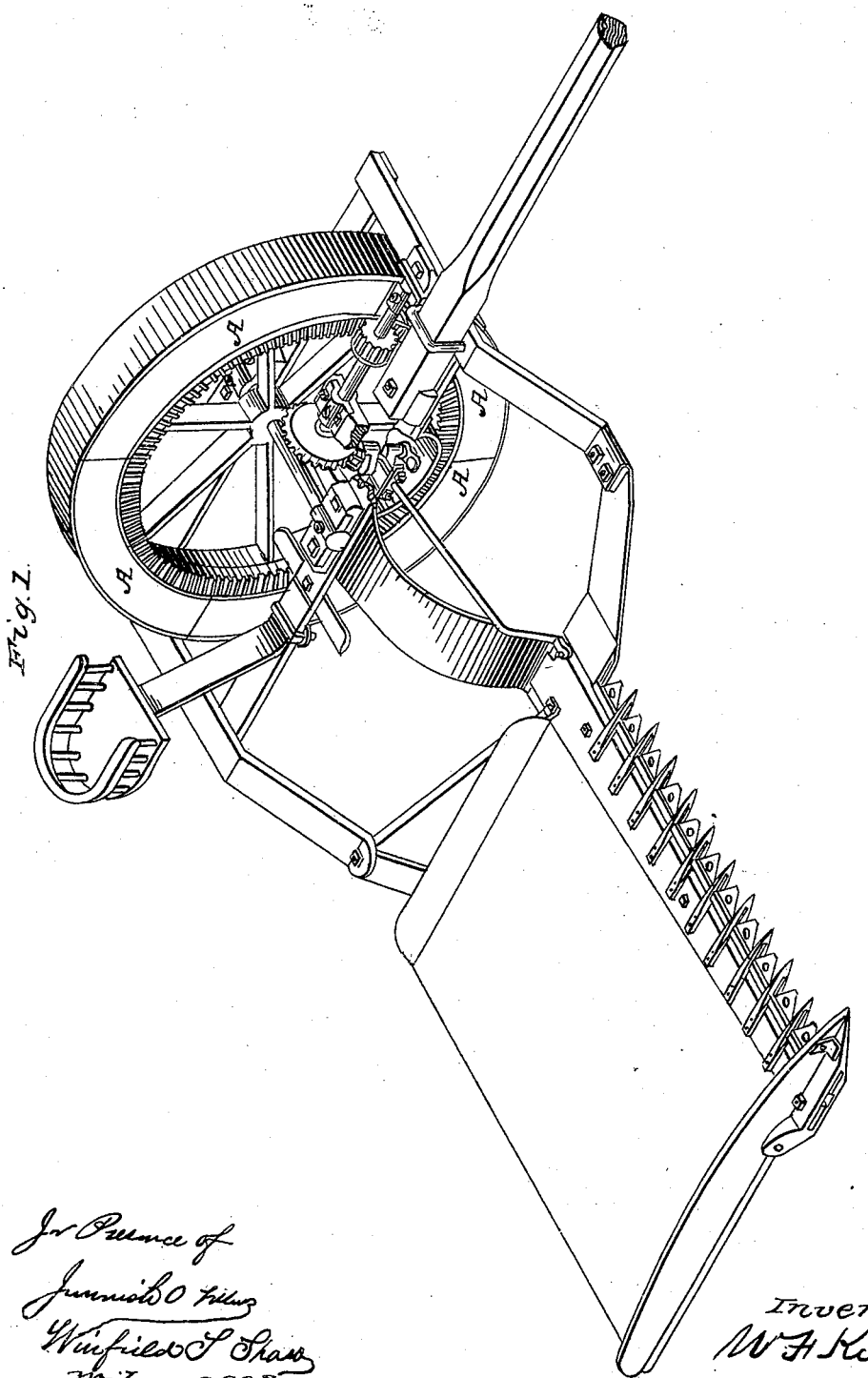
W. F. KETCHUM.
Mowing Machine.
No. 12,113.
2 Sheets—Sheet 1.
Patented Dec. 19, 1854.

W. F. KETCHUM.
Mowing Machine.

No. 12,113.

2 Sheets—Sheet 2.

Patented Dec. 19, 1854.

Witnesses

Inventor
W F Ketchum

UNITED STATES PATENT OFFICE.

WILLIAM F. KETCHUM, OF BUFFALO, NEW YORK, ASSIGNOR TO R. L. HOWARD.

IMPROVEMENT IN GRAIN AND GRASS HARVESTERS.

Specification forming part of Letters Patent No. 12,113, dated December 19, 1854.

*To all whom it may concern:*

Be it known that I, WILLIAM F. KETCHUM, of the city of Buffalo, in the county of Erie and State of New York, have invented a new and useful Improvement in a Combined Mowing and Reaping Machine, by which a mowing-machine is changed to a reaping-machine, with the usual attachment of a platform; and I do hereby declare that the following is a full and exact description thereof, reference being had to the accompanying drawing, and to the letters of reference marked thereon.

The nature of my invention consists in enlarging the diameter of the driving-wheel of a mowing-machine for the purpose of changing the mowing-machine to a reaping-machine.

It is well known that a much higher speed in the motion of the cutters is required in a mowing-machine for cutting grass than in a reaping-machine for cutting grain. It is also well known that in cutting grain the cutters should be placed higher and should cut the stubble higher than in cutting grass; and, also, that in mowing-machines for cutting grass the cutters must be so arranged with the gearing and propelling apparatus as to have them lie upon the ground, and they cannot be very much changed in their elevation from the ground, and are usually permanently attached to the frame of the machine, and of course cannot be elevated without raising the whole frame, which is also permanently attached to the shaft of the driving-wheel. It is also well known that in most mowing-machines now in use the cogs of the machinery would be apt to be clogged in changing from grass to stubble land by the dirt getting into them; and if the same driving-wheel is used the draft of the machine would be increased. All of these difficulties have concurred to render the construction and operation of a combined machine for mowing and reaping very difficult to accomplish, and they are all materially, if not fully, remedied by my invention. The speed in the motion of the cutters is lessened; the cutters are elevated to a proper height without detaching them from the frame; the cogs of the machinery are raised from the ground, and the draft of the machine is very much lessened.

To enable others skilled in the art to make and use my invention, I will proceed to describe its construction and operation.

The ordinary diameter of the driving-wheel of a mowing-machine is about three feet.

My invention consists in enlarging the diameter of the driving-wheel of a mowing-machine by attaching on the outside of the rim or felly thereof another rim or felly of sufficient thickness (marked in the drawing A A A A) to enlarge the wheel enough to elevate the cutters to a suitable height to cut grain. I make this extra rim or felly of wood, (it may be made of metal or may be cast of iron,) and I make it in four parts or sections for convenience in moving, and in bolting the same to the wheel, which I do with one bolt to each part, passing through both rims; and these parts or sections are fitted to the cogs on the outside of the rim of the driving-wheel, and are thus made secure and fast. The ouside of this extra rim or felly I cover with sheet iron or steel to protect the same, and if made six inches in thickness the diameter of the driving-wheel will be increased one foot, and the cutters will, in consequence, be elevated about six inches from the ground, which is about the proper height. This extra rim may also be made in a skeleton form, so as not to add too much to the weight of the wheel, and in more or less pieces. By attaching this extra rim or felly to the driving-wheel of a machine constructed and rigged for mowing grass, and bolting an ordinary platform to the cutter-bar, which I sustain by a curved piece of iron or steel on the bottom sufficiently broad for the platform to slide upon, you have a very simple and effective reaper, and by detaching the said platform and the said extra rim or felly, which may be done very easily and rapidly, the said reaper is converted back into a mowing-machine.

What I claim as my invention, and desire to secure by Letters Patent, is—

The enlargement of the driving-wheel for the purposes aforesaid and as herein set forth.

WILLIAM F. KETCHUM.

Witnesses:
J. W. HOOKER,
HENRY SPAYTH.